UNITED STATES PATENT OFFICE.

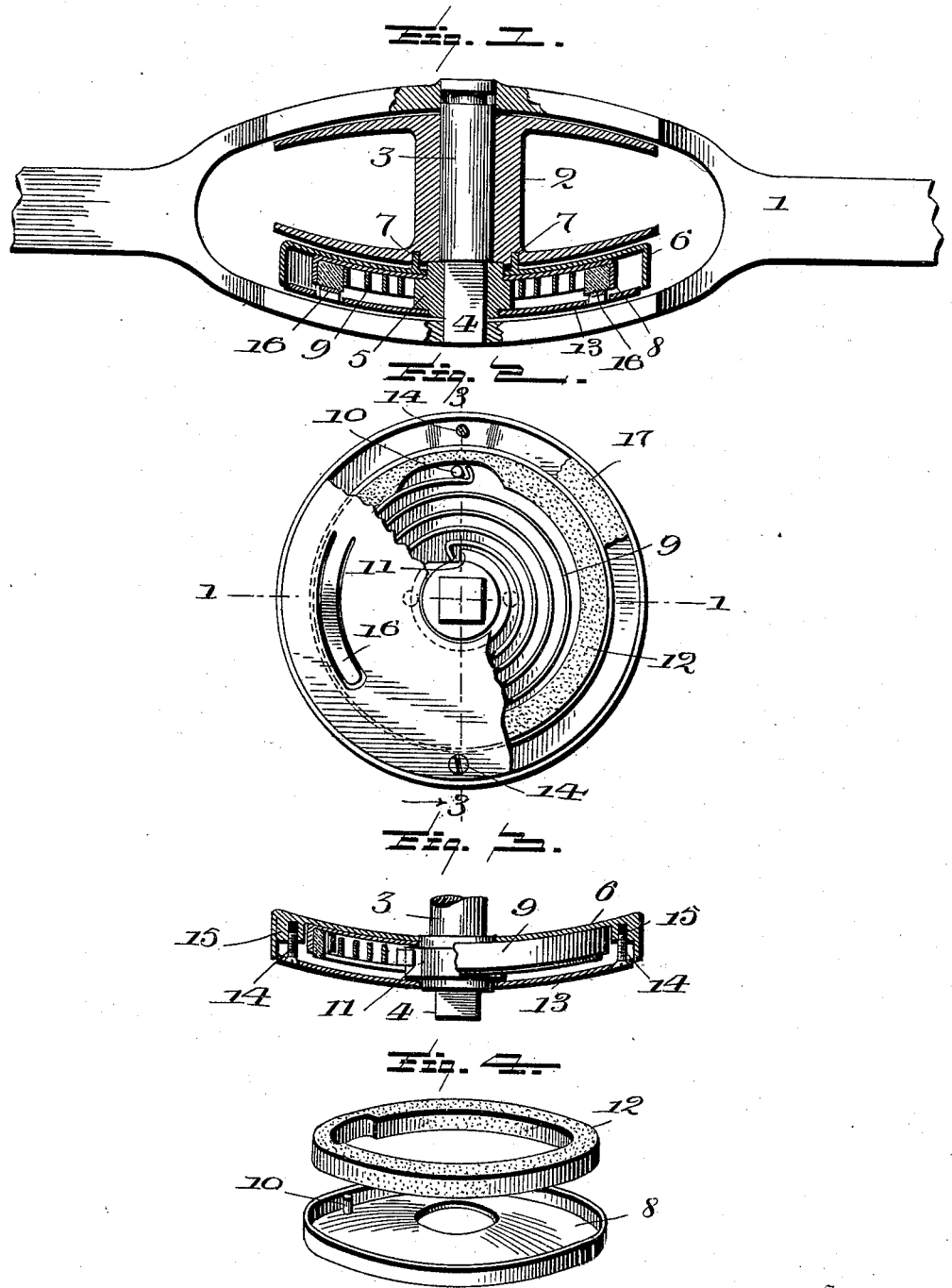

CHARLES H. HEINDEL, OF GLEN ROCK, PENNSYLVANIA.

TENSION DEVICE FOR LOOM-SHUTTLES.

SPECIFICATION forming part of Letters Patent No. 627,263, dated June 20, 1899.

Application filed February 8, 1899. Serial No. 704,919. (No model.)

*To all whom it may concern:*

Be it known that I, CHARLES H. HEINDEL, a citizen of the United States, residing at Glen Rock, in the county of York and State of Pennsylvania, have invented certain new and useful Improvements in Tension Devices for Loom-Shuttles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to tension devices for loom-shuttles, and has for its object to provide a tension device in which there will be a more positive frictional contact between certain of the parts than has heretofore been attained and in which the friction can be more readily adjusted or regulated, and also in which the tension-spring will at its two ends be allowed to disengage themselves and move away from their bearings under certain conditions, so as to guard against the snapping and breaking of the spring in the sudden recoil of the spring and without moving out of line with their bearings, so that when tension is to be placed upon the spring its ends will reengage with their bearings.

To the accomplishment of the foregoing and such other objects as may hereinafter appear, the invention consists in the construction and in the combination of parts hereinafter particularly described and then sought to be specifically defined by the claims, reference being had to the accompanying drawings, forming a part hereof, and in which—

Figure 1 is a section through the bobbin and tension device on the line 1 1 of Fig. 2, showing said parts applied to a shuttle, a portion of the shuttle being in section. Fig. 2 is a face view of the tension device with a portion of its cap or face-plate broken away to show the interior of the device. Fig. 3 is a sectional view on the line 3 3 of Fig. 2, looking in the direction of the arrow; and Fig. 4, a detail view of portions of the tension device separated from each other.

In the drawings the numeral 1 designates a shuttle of any approved pattern, within which is placed a bobbin 2, journaled upon the shaft 3, so as to turn thereon, said shaft having an angular shoulder 4 fitting in a corresponding opening in the shuttle, so that the shaft will be non-rotatable. Upon the angular shoulder 4 of the shaft is mounted a stationary hub 5. Encircling this hub is a cup-shaped disk or plate 6, which is free to turn upon the hub and is secured to the bobbin 2 by means of pins 7, so as to turn with the bobbin. Within this cup-shaped disk or plate 6 is a smaller cup-shaped disk or plate 8, which is free to turn upon the hub 5. Within the cup-shaped disk or plate 8 is placed a spiral spring 9, one end of which is adapted to engage a bearing 10, which may be in the form of a pin secured to the disk 8 and the other end adapted to engage a bearing in the form of a shoulder 11 on the hub 5. It will be observed that the bearings 10 and 11 are of such form and that the ends of the spring engage therewith in such manner that when tension is put upon the spring the two ends of the spring will bear or pull firmly upon their bearings and that when the tension upon the spring is released the ends of the spring can recede or retreat from their bearings, or, in other words, the ends of the spring will be released from the bearings and yet continue to bear such relation to the bearings that when the spring is moved back to its normal position its ends will at once engage their bearings, so as to permit tension to be again placed upon the spring. This feature of the invention guards against the liability of snapping or breaking the spring when the tension thereon is suddenly released, which snapping is liable to occur upon the sudden release of the tension upon the spring if the ends of the spring be fixed to their bearings, so as not to be free to recede therefrom upon the sudden recoil of the spring.

Within the cup-shaped disk or plate 8 is placed the circular washer 12, of felt or leather or equivalent material, said washer encircling the spring and bearing against the inner wall of the cup-shaped disk or plate, as illustrated in the drawings. The open face of the cup-shaped disk or plate 6 is closed or covered by a face-plate 13, which fits around the hub 5 and is secured to the cup-shaped disk or plate 6 by means of screws 14, which engage screw-threaded sockets 15 in the cup-shaped disk 6, so that said cap will turn at all times and under all conditions with the cup-shaped disk 6. This cap or cover-plate 13 serves to exclude all dirt and grease or oil from the interior of the cup-shaped disk or plate 6 and also serves to carry springs 16, which may be formed by cutting and bending a portion of the cap, although said springs may be otherwise formed and connected to said cap or face-plate 13. These springs 16 are so located that they will press upon the washer 12, and thus create such friction that the cup-shaped disk or plate 8 will be carried around with the cap or cover-plate 13 and the cup-shaped disk 6 until the tension created by winding up the coiled spring will be sufficient to overcome the friction between the washer and the springs to the cap or face-plate, after which the cup-shaped disk 8 will be held substantially stationary, while the cap or face-plate and the cup-shaped disk 6 will continue to rotate with the bobbin. The degree of friction between the springs carried by the cap or face-plate 13 and the washer 12 may be regulated by tightening or loosening the screws 14, which secure the cap or face-plate to the cup-shaped disk 6. If desired, I may also fill the space between the walls of the outer and the inner cup-shaped disks 6 and 8 with a washer 17, made of material similar to the washer 12, so as to afford additional frictional surface.

In operation as the wire or other strand is unwound from the bobbin the bobbin and the tension device turn together, and in so doing the coiled spring is wound up until its tension overcomes the friction between the springs on the cap or face-plate and the washer, and after that time the inner cup-shaped disk and spring remain substantially stationary until the shuttle reaches the end of its stroke. At this time, owing to the momentum of the shuttle, a slack in the wire is created, and this slack is taken up immediately by the recoil of the spring and consequent reverse motion of the tension device and bobbin, so that the slack is rewound upon the bobbin. This sudden recoil of the spring has a tendency to snap the spring if the ends of the spring be immovably connected with their bearings; but in my device this tendency to snap is obviated by the manner described of connecting the ends of the spring to their bearings.

The construction of the several parts of the tension device is simple, thus rendering the device comparatively inexpensive to make, and the parts can be readily assembled and dismembered when necessary, and a tension device constructed as described possesses advantages over other forms heretofore in use.

I have illustrated in the drawings the tension device and the ends of the bobbin as made of a curved form; but it is obvious that such form is not essential, as the several parts can be made straight or flat in form, and the parts of my invention operate equally as well as in the particular shape of the parts illustrated. It will also be observed that the washer 12 is partially cut away or formed with a recess at a point where the outer end of the coiled spring engages its bearing, so as to not interfere with the receding movement of the end of the spring before described.

While this invention is particularly well adapted to loom-shuttles, still it is obvious that it may be used in other places or form of devices where it is desirable to have means for taking up the slack in a strand drawn from a bobbin.

I have illustrated and described the preferred details of construction of the several parts; but it is obvious that changes can be made therein without departing from the essential features of the invention.

Having described my invention and set forth its merits, what I claim is—

1. The combination with the bobbin, of a tension device comprising a disk or plate rotatable with the bobbin, a coiled spring, bearings for the opposite ends of the spring with which the ends of the spring have a loose connection that will permit them to retreat therefrom upon the release of tension, a cap or plate for covering the spring, said cap moving with the rotatable disk or plate under all conditions and having springs projecting from the under side thereof and bearing against the part which carries the coiled spring, substantially as described.

2. The combination with a bobbin, of a tension device comprising a cup-shaped disk or plate rotatable with the bobbin, a disk or plate located within said cup-shaped disk, a coiled spring connected at one end to said interior disk or plate and at the other end connected with a stationary bearing, a washer carried by said interior disk or plate, and a cap or face-plate secured to said cup-shaped disk or plate so as to move therewith under all conditions, and a spring carried by the cap and bearing against the washer on the inner disk or plate, substantially as and for the purposes described.

3. The combination with the bobbin, of a tension device comprising the cup-shaped disk or plate rotatable with the bobbin, a second cup-shaped disk or plate located within the other cup-shaped disk or plate, a coiled spring connected at one end to the interior cup-shaped disk or plate and at the other end to a stationary bearing, a washer carried by the inner cup-shaped disk or plate, and a cap applied to one side of the outer cup-shaped disk or plate and connected thereto to rotate with it under all conditions and having a spring struck up from a portion thereof and bearing against the washer carried by the inner cup-shaped disk or plate, substantially as described.

4. The combination with a bobbin, of a tension device comprising the cup-shaped disk or plate rotatable with the bobbin, a second cup-shaped disk or plate located within the other cup-shaped disk or plate, a coiled spring connected at one end with the inner cup-shaped disk or plate and at the other end with a stationary bearing, a washer carried by said inner cup-shaped disk or plate, a cap provided with a spring bearing against said washer, and connected with the outer cup-shaped disk or plate to rotate therewith under all conditions, and screws connecting said cap and disk or plate and regulating the tension of the spring on said washer, substantially as described.

5. The combination with the bobbin, of a tension device comprising a cup-shaped disk or plate rotatable with the bobbin, a second cup-shaped disk or plate located within the other cup-shaped disk or plate, a coiled spring, bearings for the opposite ends of said spring, one of said bearings being carried by the inner cup-shaped disk and the other being a fixed bearing, the ends of said spring connected with said bearings so as to recede therefrom on the recoil of the spring, a washer carried by the inner cup-shaped disk or plate, a cap connected with the outer cup-shaped disk or plate to rotate therewith under all conditions, and a spring attached to said cap and bearing against said washer, substantially as described.

In testimony whereof I have affixed my signature in presence of two witnesses.

CHARLES H. HEINDEL.

Witnesses:
BOYD C. WILKINSON,
HENRY R. KRABER.